Jan. 15, 1952  J. D. ELLIS  2,582,420
PIVOTAL MOUNTING
Filed May 27, 1949
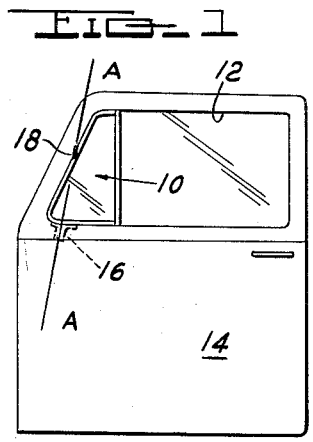
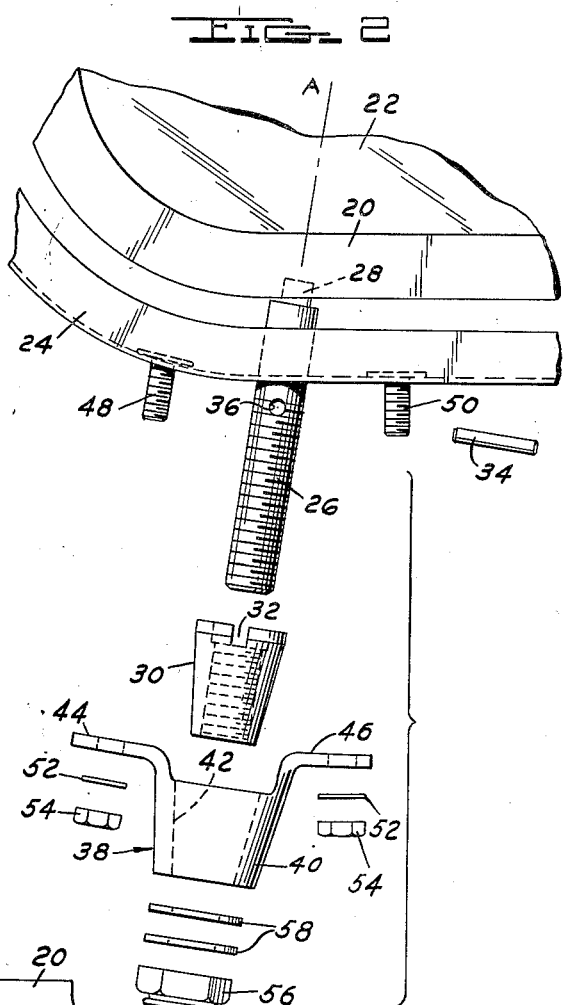
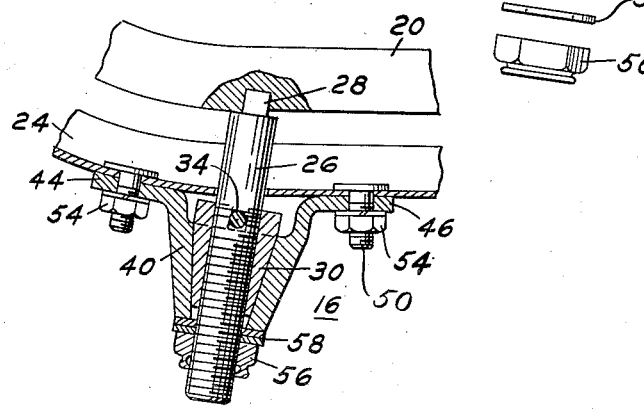
INVENTOR.
JOHN DEAN ELLIS
BY
*Burton & Parker*
ATTORNEYS Patented Jan. 15, 1952

2,582,420

UNITED STATES PATENT OFFICE 2,582,420

PIVOTAL MOUNTING

John Dean Ellis, Troy, Ohio

Application May 27, 1949, Serial No. 95,839

5 Claims. (Cl. 16—140)

This invention relates to pivotal mountings and particularly to pivotal mountings adapted especially for resistingly swingable windows in motor vehicles.

Heretofore it has been the practice to utilize coil springs in the pivotal mountings of swinging windows for frictionally holding the windows in adjusted position. Coil springs deteriorate in use and quite frequently the frictional resistance with which the window is held in adjusted position is lessened to the extent that the window is free to swing out of its adjusted position. Moreover, the pivotal mountings heretofore employed have been difficult to reach for the purpose of adjustment as wear occurs and in the event the parts are improperly assembled for operation.

An important object of this invention is to provide an improved pivotal mounting for windows which provides stability for the member or window supported thereby and maintains its resistance to turning movement without appreciable variation for the life of the mounting. Another important object of the invention is to provide a pivotal mounting which eliminates the use of a coiled spring and which is particularly adapted for use in mounting the vent or deflector windows on either side of the automobile for providing adjustable swinging movement relative to the body of the vehicle. A further important object of the invention is to provide a mounting of this character composed of few parts of relatively simple construction which may be readily fabricated, assembled and installed without difficulty and at low cost.

In carrying out the invention, the pivotal mounting includes a pin forming the axis about which the window or other object rotates and two tapered bodies engaging one another and acting to impose a resistance to the turning movement of the pin. One tapered body is fitted directly on the pin preferably by being threaded thereon and is jointly rotatable therewith, and the other body is internally tapered to receive the former body and is rigidly secured to a fixed support. The parts of the device form a compact assembly and capable of installation in an automobile or other supporting structure without difficulty and in such a manner as to be concealed from view. The parts are capable of adjustment after installation such that the resistance to turning movement of the window can be varied to suit the convenience of the operator.

Various other objects, advantages and meritorious features of the invention will become more fully apparent from the following specification, appended claims and accompanying drawings, wherein:

Fig. 1 is a side elevation of an automobile door illustrating the mounting therein of a vent window incorporating the pivotal mounting of the present invention, Fig. 2 is an exploded view of the parts of the pivotal mounting and portions of the window frame and sash illustrating the parts in the order of their assembly, and Fig. 3 is a vertical sectional view through the assembled pivotal mounting.

Referring particularly to the drawings, the pivotal mounting is shown applied to a window of an automobile and particularly to a vent or deflector section of a window of one of the doors of an automobile. It is understood that the pivotal mounting may be used for windows in any other environment and for a journal mounting for any resistingly swingable member.

In Fig. 1, the vent window section is generally indicated at 10, and as in conventional automobile design, it is located at the forward end of a window opening 12 of an automobile door 14. The vent window 10 is supported for swinging movement about an axis indicated at A—A, and to provide such movement two journal mountings are employed, one being indicated below the window 10 at 16 and the other being indicated adjacent to the upper end of the window at 18. One or both of these pivotal mountings may incorporate the features of the present invention. Usually for the small window deflectors of the characters shown in Fig. 1, only one pivotal mounting of the present invention is necessary. It is understood, however, that for larger windows two such pivotal mountings may be provided on opposite sides of the window in axial alignment with one another.

Referring specifically to Figs. 2 and 3, the vent or deflector window 10 comprises a frame 20 which may extend completely around the glass window section 22 of the deflector or partially therearound. The vent or deflector window section occupies the forward portion of the window opening 12. The automobile door is provided with a frame 24 extending completely around the opening 12 and forms a fixed part of the body of the door. The deflector frame 20 may be solid as shown in section in Fig. 3 whereas the frame 24 around the window opening 12 may be channel shaped as shown in Fig. 3, the channel opening inwardly of the plane of the window.

The pivotal mounting or journal of the present invention comprises an elongated cylindrical member or pivot pin 26 which as shown in Figs. 2 and 3 is externally threaded for the major portion of its length. The upper end of the pin 26 is reduced to form a short end extension 28 which is of square shape formation for connection to the deflector frame section 20. In assembled position in the automobile, the reduced extension 28 is fitted into a recess of a shape corresponding to the window opening so that both the window and the pin 26 are jointly rotatable. The base of the channel strip 24 forming the framing around the window opening is provided with an aperture through which the pin 26 extends as best shown in Fig. 3.

In assembled position, the threaded portion of the pivot pin 26 is located below the journal frame 24 and the pin may extend at an inclination to the vertical as shown in the drawings or in a true vertical direction depending upon the construction of the automobile door. The threaded portion of the pin receives an assembly comprising two tapered members and several small auxiliary elements serving to connect the members and the pin together into a unitary assembly. One member is in the form of an externally tapered bushing 30 which is internally threaded for threaded engagement with the pivot pin 26. The internal bore of the bushing is enlarged slightly in the wider end thereof and provided with a pair of aligned recesses or cut-outs 32 on diametrically opposite sides thereof. When threaded to the desired position on the pin 26, the bushing 30 is locked thereto for joint rotation therewith by means of a removable transverse pin 34. This last small pin is received in a transverse hole 36 extending through the pivot pin 26. In completely assembled condition the transverse pin 34 projects beyond the sides of the pivot pin 26 and lies in the recesses 32 in the manner shown in Fig. 3. Thus in assembled condition the bushing 30 is held to the pivot pin 26 for joint rotation but it is obvious that upon disconnection of the locking pin 34 the bushing 30 may be threadedly adjusted on the pivot pin to vary its axial position therealong.

The other tapered member of the assembly is in the form of a hollow body or casing 38 which encloses a bushing 30 and is immovably secured to the frame 24 of the window construction. The body 38 is preferably formed of cast metal and includes a conically shaped sleeve portion 40 having an internally tapered bore 42 and two oppositely extending wing portions or ears 44 and 46. The taper of the bore 42 corresponds to the external taper of the part 30.

The ears 44 and 46 are employed to secure the body to the window frame 24 in suspended relation thereto in the manner shown in Fig. 3. For this purpose, two bolts 48 and 50 are disposed in downwardly projecting relationship from the frame 24 on the opposite sides of the pivot pin 26. The ears 44 and 46 are apertured as shown in dotted outline in Fig. 2 to receive the bolts 48 and 50 respectively. The securement of the body 38 to the window frame is completed by the provision of a washer 52 and a nut 54 for each bolt 48 and 50. The nuts are threaded to the projecting ends of the bolts in the manner shown in Fig. 3 and when tightened thereon draw the ears 44 and 46 against the underside of the frame member 24. The ears may be spaced differently from the sleeve portion 40 and lie in planes inclined slightly to one another as shown in order to accommodate the assembly to the curvature of the frame 24.

The pivot pin 26 is of such a length as compared to the body or casing 38 that it projects below the lower end thereof as shown in Fig. 3. Threaded on the projecting end of the pivot pin is a nut 56. One or more washers 58 are preferably interposed between the nut 56 and the lower end of the casing 40 such that when the nut is tightened on the pivot pin the washers are brought into abutting relationship with the lower end of the casing in the manner shown in Fig. 3.

Fig. 2 illustrates the relation of the parts in the order of their assembly. First, the bushing 30 is threaded on the pivot pin 26 until the recesses 32 thereof are approximately on the level of the transverse hole 36 in the pivot pin. The casing 38 is then slipped over the bushing and the bolts 48 and 50 are secured to their respective ears 44 and 46. The exteriorly tapered surface of the bushing 30 and the internally tapered surface 42 of the casing are so shaped that the two surfaces are brought into full surface contact when the assembly is completed in the manner shown in Fig. 3. After the nuts 54 have secured the casing in fixed relationship on the window frame, the remaining nut 56 of the assembly is loosely threaded on the projecting extremity of the pivot pin.

The assembly thus far described is complete except for the insertion of the locking pin 34. With the parts in relatively loose condition by virtue of the fact that the nut 56 is not tightened, the bushing 30 may be rotatably adjusted either half a turn or one or more complete turns on the pivot pin to vary its axial position therealong. Such adjustment will vary the projecting relationship of the reduced end 28 of the pivot pin with respect to the window frame 24. In one direction of its rotatable adjustment the bushing will raise the pivot pin slightly and conversely when rotated in the opposite direction will lower the pivot pin slightly. It is possible by this adjustment to regulate the position of the upper end of the pivot pin such that the window is held in a stable position without any play between the two pivotal mountings 16 and 18. When the desired position is found, the locking pin 34 is inserted through the transverse hole 36 of the pivot pin with the ends thereof projecting into the recesses 32 of the bushing to lock the latter to the pivot pin for joint rotation. Thereafter the nut 56 on the lower extremity of the pivot pin may be threaded home to hold the parts in completely assembled position.

At the time of assembly and installation or later during the use of the mounting, it is possible to vary the frictional resistance between the bushing 30 and the internal bore 42 of the casing by tightening or loosening the nut 56. After the pivotal mounting has been installed on an automobile, for example, it is occasionally desirable to vary the frictional resistance of the window to turning movement. This is easily accomplished by adjusting the nut 56 on the pivot pin. When threaded in a direction to axially advance the nut upwardly along the pivot pin the action will cause the pivot pin and the bushing thereon to move downwardly slightly relative to the casing and bring it into more binding relationship therewith. As a result, the frictional resistance between the bushing and the casing may be increased in this manner. Conversely, slightly unthreading the nut 56 will increase the play between the bushing and the casing and allow the window to be turned with greater ease.

In addition to the adjustment of the frictional resistance, which can be accomplished at any desired time, the bushing 30 may be rotatably adjusted relative to the pivot pin to remove or lessen any vertical looseness which may develop between the window 10 and the frame 24. This is accomplished by removing the small locking pin 34 and threadedly adjusting the bushing on the pivot pin until the window engaging end thereof projects an amount from the frame 24 which provides the desired stability.

The nut 56 on the lower end of the stud or pin 36 is preferably a conventional self-locking nut and for that purpose it may be constructed as shown in Fig. 3 with an internal annular recess in which is received a suitable material for releasably locking the nut in any tightened position on the pin.

What I claim is:

1. A pivotal mounting comprising, in combination, an externally threaded pin, an externally tapered bushing member threaded on said pin, an internally tapered housing member contactually enclosing the bushing member and resisting the rotation of the latter relative thereto, means threaded on said pin for adjusting the frictional resistance between said members, and means for releasably locking the bushing member in axially adjusted position on the pin.

2. A pivotal mounting for providing resisting turning movement of an object comprising, in combination, an externally threaded pin coupled at one end with the object to rotate therewith, an externally tapered bushing threaded on said pin, a housing enclosing the bushing having an internally tapered surface facially engaging the external tapered surface of the bushing to provide frictional resistance to the rotation of the bushing, said pin and bushing being relatively axially adjustable upon threaded rotation of the bushing upon the pin, means adapted to releasably lock the bushing member in adjusted threaded position on the pin to provide joint rotation of the same, and means threaded on the end of the pin opposite to the object engaging end thereof and operable to axially shift the pin and bushing relative to the housing to vary the frictional resistance between the engaging surfaces thereof.

3. A pivotal mounting for providing resisting turning movement of an object comprising, in combination, an externally threaded pin having one end connected with the object so as to provide joint rotation thereof about the axis of the pin, a bushing threaded on said pin, said bushing having an externally tapered surface, means for releasably locking the bushing to the pin for joint rotation therewith, said bushing and pin being relatively axially adjustable upon release of said locking means, a fixed housing enclosing the bushing, said housing having an internal surface tapered to correspond to that of the bushing and engaging the tapered surface of the bushing to provide frictional resistance to the rotation of the bushing and the pin, and a nut threaded on the end of the pin opposite to the object engaging end thereof, said nut adapted to be tightened against said housing to draw the bushing thereagainst, said nut adapted upon threaded adjustment in tightened position to axially shift both the pin and the bushing relative to the housing to vary the frictional resistance to rotation of the engaging tapered surfaces.

4. A pivotal mounting for a window comprising, in combination, an externally threaded pin having one end thereof coupled with the window in such a manner that the window and the pin are jointly rotatable about the axis of the latter, an externally tapered bushing threaded on the pin, means for releasably locking the bushing in threaded adjusted position on the pin, a fixed housing enclosing the bushing and provided with an internally tapered surface contactually engaging the externally tapered surface of the bushing to provide a frictional resistance to the rotation of the bushing, a nut threaded on the end of the pin opposite to the window engaging end thereof and reacting with the housing to axially shift the pin and bushing relative to the housing to vary the frictional resistance between said engaging tapered surfaces.

5. A pivotal mounting for a window comprising, in combination, an externally threaded pin having one end adapted to be coupled with the window for joint rotation therewith, an externally tapered bushing threaded on said pin, said bushing provided at one end with diametrically disposed recesses shaped to receive a transversely extending locking element, said pin provided with a transverse hole to receive said locking element, a locking element removably receiveable through said hole and recesses for locking the bushing to the pin to rotate therewith, said bushing and pin being relatively axially adjustable upon removal of said locking element, a fixed housing enclosing the bushing provided with an internally tapered surface contactually engaging the externally tapered surface of the bushing to frictionally resist rotation of the bushing and the pin, and a nut threaded on the end of the pin opposite to the window engaging end thereof and adapted upon threaded adjustment to exert a reacting force between the fixed housing and the pin such that the latter and the bushing are both axially shifted relative to the housing to vary the frictional resistance between said engaging tapered surfaces.

JOHN DEAN ELLIS.

REFERENCES CITED

The following references are of record in the file of this patent:

UNITED STATES PATENTS

| Number | Name | Date |
|---|---|---|
| 33,839 | Hill | Dec. 3, 1861 |
| 1,125,177 | Rixson | Jan. 19, 1915 |
| 1,624,919 | Bommer | Apr. 19, 1927 |

FOREIGN PATENTS

| Number | Country | Date |
|---|---|---|
| 303,640 | Great Britain | Jan. 10, 1929 |
| 700,353 | Germany | Dec. 18, 1940 |